United States Patent
Surmay

(10) Patent No.: US 9,300,715 B2
(45) Date of Patent: Mar. 29, 2016

(54) OPTIMAL USE OF MULTIPLE CONCURRENT INTERNET PROTOCOL (IP) DATA STREAMS FOR VOICE COMMUNICATIONS

(71) Applicant: Bandwidth.com, Inc., Raleigh, NC (US)

(72) Inventor: Stan Surmay, Cary, NC (US)

(73) Assignee: Bandwidth.com, Inc., Raleigh, NC (US)

( * ) Notice: Subject to any disclaimer, the term of this patent is extended or adjusted under 35 U.S.C. 154(b) by 33 days.

(21) Appl. No.: 14/806,936

(22) Filed: Jul. 23, 2015

(65) Prior Publication Data

US 2015/0334154 A1    Nov. 19, 2015

Related U.S. Application Data

(60) Provisional application No. 62/158,858, filed on May 8, 2015.

(51) Int. Cl.
| | |
|---|---|
| *H04L 12/28* | (2006.01) |
| *H04L 29/06* | (2006.01) |
| *H04L 12/46* | (2006.01) |
| *H04W 16/14* | (2009.01) |
| *H04J 1/16* | (2006.01) |

(52) U.S. Cl.
CPC .......... *H04L 65/608* (2013.01); *H04L 12/4625* (2013.01); *H04W 16/14* (2013.01)

(58) Field of Classification Search
USPC .......................... 370/230, 252, 329, 401, 487
See application file for complete search history.

(56) References Cited

U.S. PATENT DOCUMENTS

| | | | |
|---|---|---|---|
| 8,675,476 B2 | 3/2014 | Brownworth et al. | |
| 8,971,205 B2 | 3/2015 | Brownworth et al. | |
| 9,014,038 B2 | 4/2015 | Brownworth et al. | |
| 2007/0064684 A1* | 3/2007 | Kottilingal ........ | H04L 29/06027 370/355 |
| 2009/0248828 A1* | 10/2009 | Gould .................. | G08B 27/005 709/207 |
| 2012/0036277 A1* | 2/2012 | Stokking .................. | H04N 7/24 709/231 |

* cited by examiner

*Primary Examiner* — John Pezzlo
(74) *Attorney, Agent, or Firm* — Gregory Stephens

(57) ABSTRACT

Examples are disclosed for hosting a communication session between a hybrid mobile device and a second communication device in an Internet Protocol (IP) based packet data network. A communications server functions as a bridge service between the hybrid mobile device and the second communication device enabling the exchange of multiple concurrent IP packet data media streams over multiple different IP based networks between the hybrid mobile device and the communications server. The communications server determines a packet arrival time for each corresponding packet in the multiple concurrent IP packet data media streams and creates a blended IP packet data media stream by selecting the first to arrive packet from among the multiple concurrent IP packet data media streams. On the send side, the communications server receives a single IP packet data media stream and simultaneously encodes it to be sent out over the multiple different IP based networks to the hybrid mobile device.

20 Claims, 9 Drawing Sheets

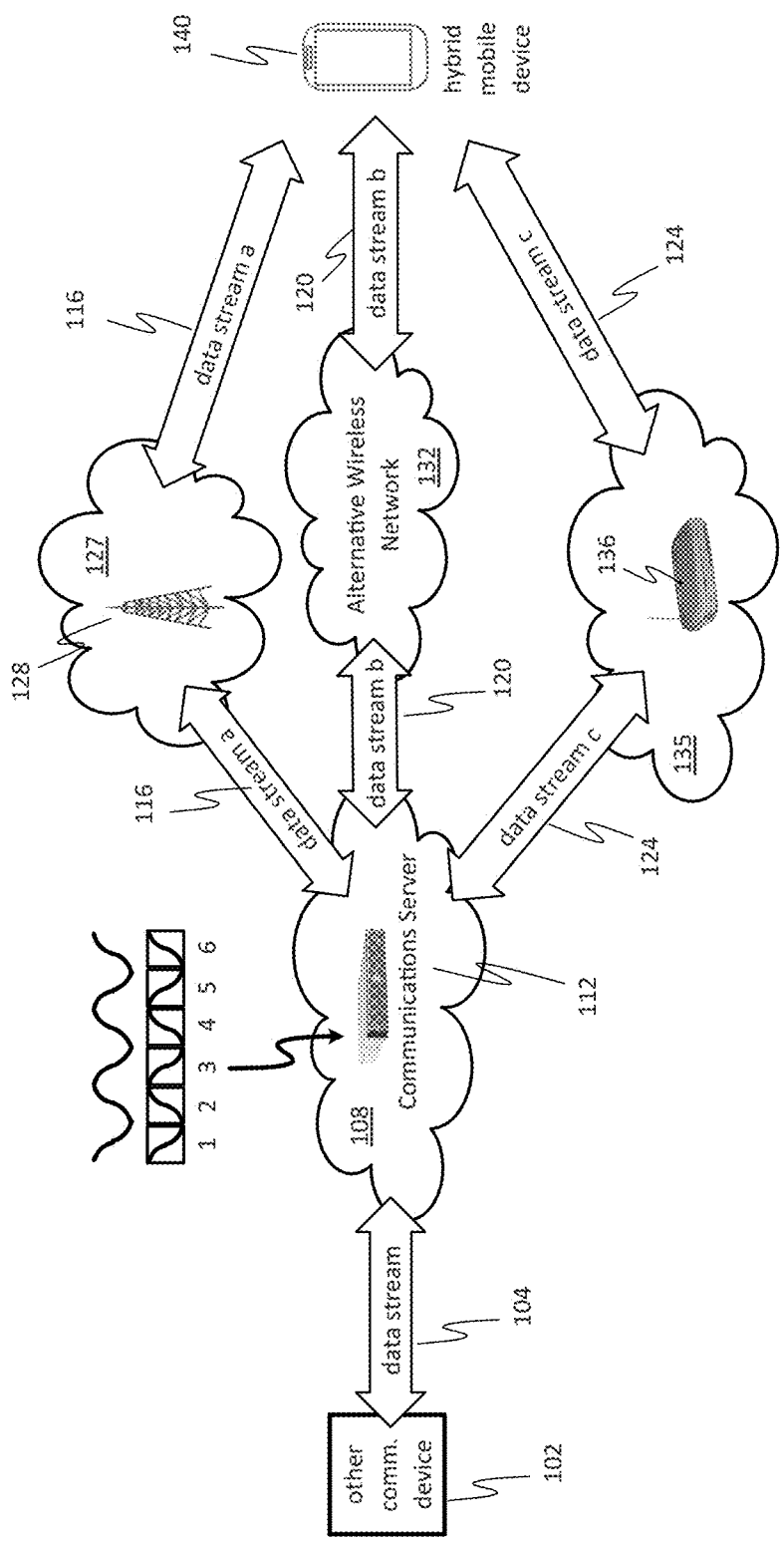

200

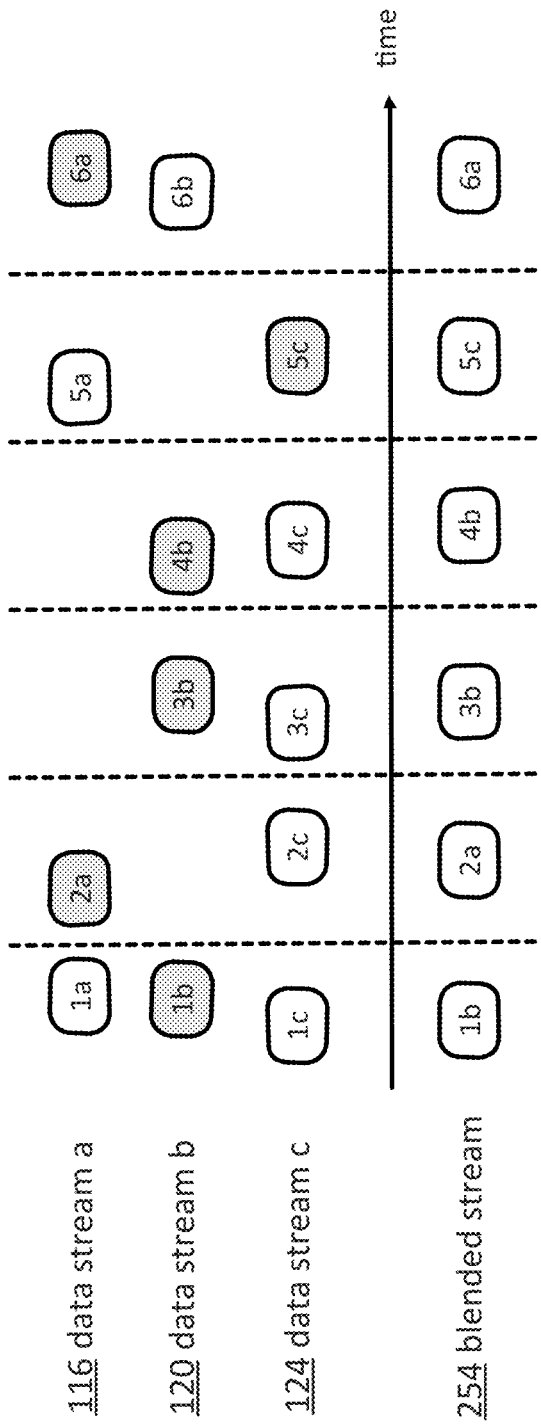

300

350

400

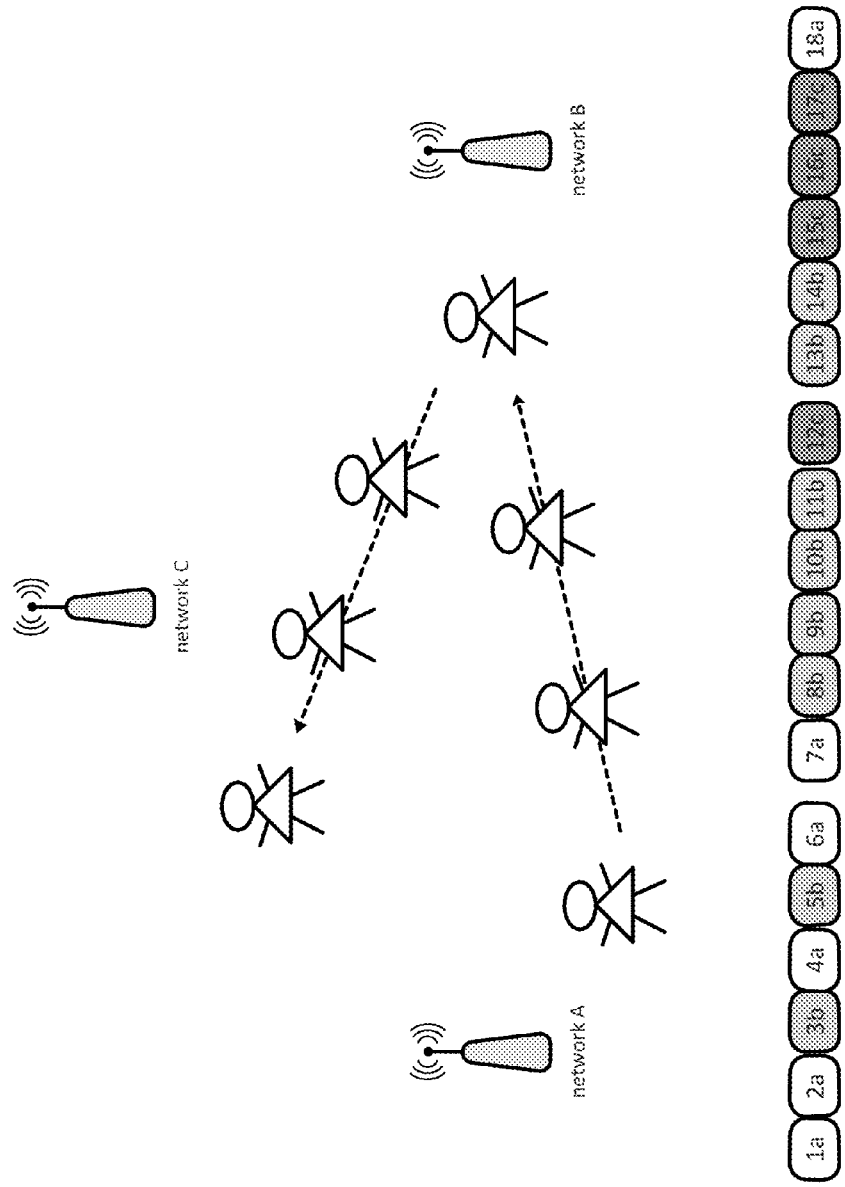

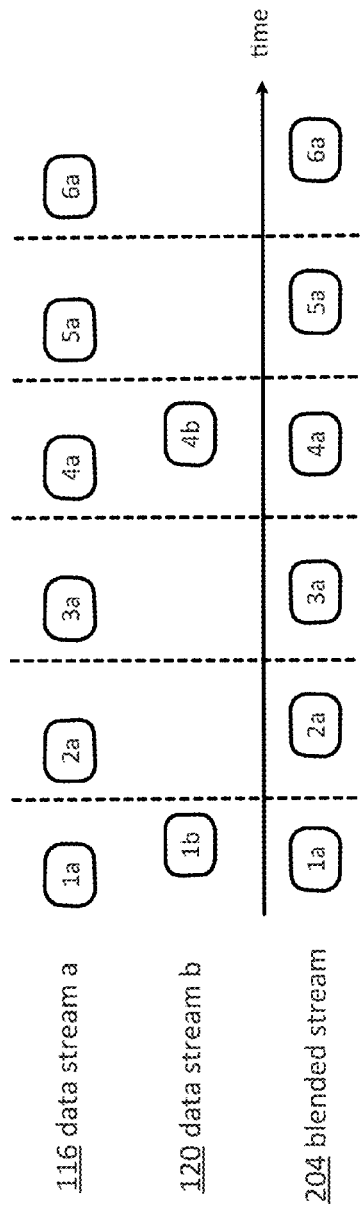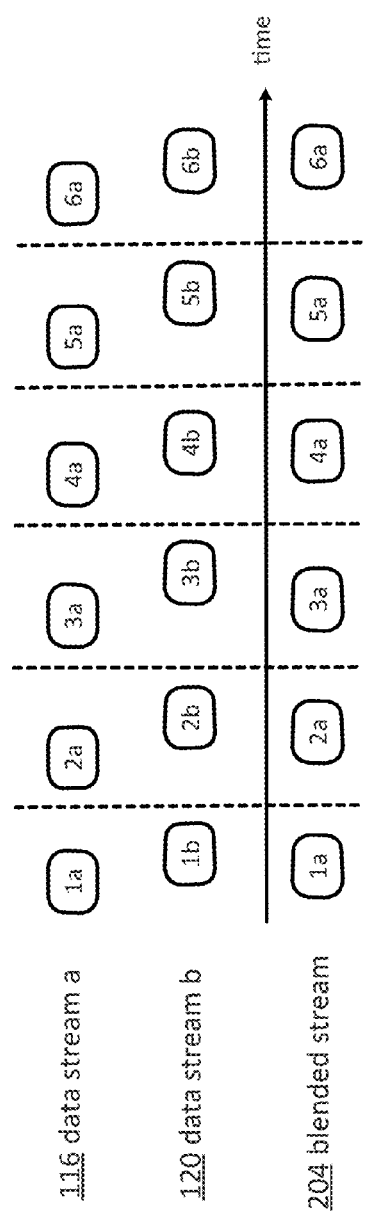

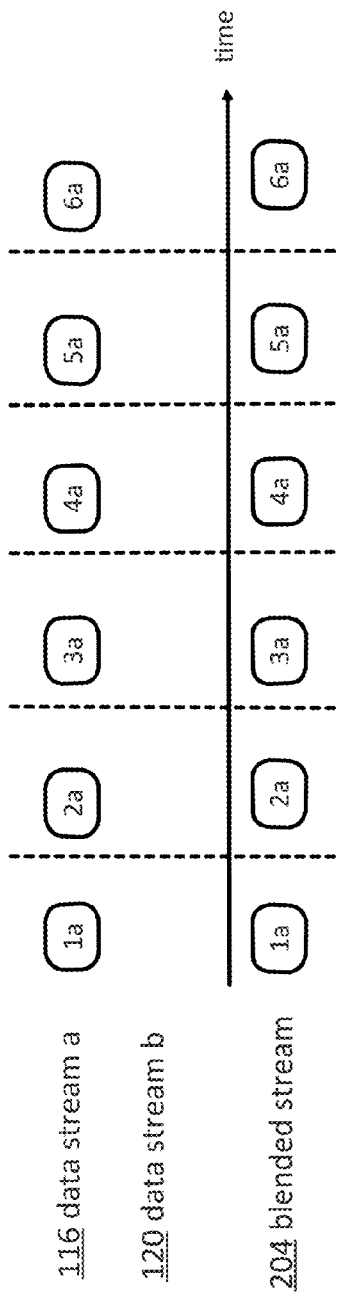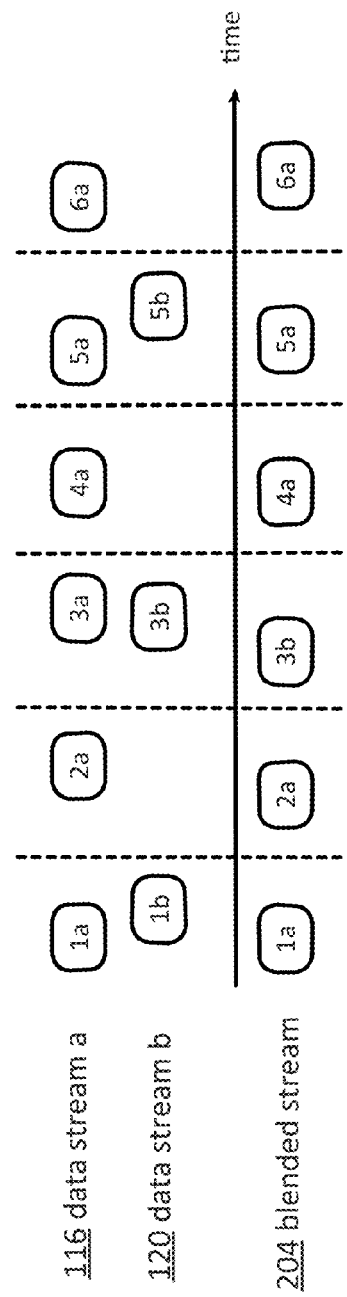
FIG. 8
800
FIG. 9
900
FIG. 10
1000

1100

OPTIMAL USE OF MULTIPLE CONCURRENT INTERNET PROTOCOL (IP) DATA STREAMS FOR VOICE COMMUNICATIONS

CROSS-REFERENCE TO RELATED APPLICATIONS

This application is a non-provisional of U.S. Prov. App. 62/158,858 filed May 8, 2015 entitled "Optimal Use of Multiple IP Streams for Voice Communications".

TECHNICAL FIELD

Examples described herein are generally related to techniques for managing concurrent Internet Protocol (IP) data streams for voice communications.

BACKGROUND

Mobile telephony devices utilizing wireless communication protocols are ubiquitous. Many of these devices utilize one of the competing circuit switched cellular networks (e.g., GSM or CDMA) to place and receive telephone calls to other telephony endpoint devices. A telephony endpoint device may include another mobile telephony device on the same or another cellular network, a Voice-over-IP (VoIP) telephony device, and/or a plain old telephone service (POTS) telephony device. A VoIP telephony device may be operable over an Ethernet (wired) connection, an 802.11 (wireless) connection, or one of the many cellular IP data connections now available. Each of these telephony endpoint devices may use a different access network but all are interfaced at some point to allow for communication among the different networks.

Recently, there has been introduced another type of mobile telephony device, one that is capable of utilizing multiple different networks depending on the current location or network conditions pertaining to the mobile telephony device. Such a mobile telephony device may be characterized as a hybrid mobile device due to its capability of making and receiving telephone calls on at least two distinct networks. Some hybrid mobile devices include the ability to start or establish a telephone call on one network (e.g., an IP based VoIP network over a wireless fidelity (WiFi) connection) and handoff the call to a second network (e.g., a circuit switched cellular network) when conditions on the original network degrade. Moreover, the VoIP network may run over a cellular IP data connection. Such a handoff may occur, for instance, when the hybrid mobile device moves out of range of the IP based WiFi access point. Rather than dropping the call, the hybrid mobile device, in conjunction with a network based communications server, may switch to a cellular connection prior to severing the WiFi VoIP connection thereby ensuring that the hybrid mobile device stays connected to the other telephony endpoint and the call is not dropped.

In addition to a full handoff, a hybrid mobile device may also utilize multiple concurrent IP data streams traversing multiple different networks to manage handoffs dynamically in a different manner. For example, a hybrid mobile device may send the same IP data stream to a network based communications server over multiple different networks simultaneously. The network based communications server may then receive and re-format the IP data stream using packets from one or more of the received IP data streams according to a particular policy. This process also works in the reverse direction. The communications server may send the same IP data stream to the hybrid mobile device over multiple different networks simultaneously. The hybrid mobile device may then receive and re-format the IP data stream using packets from one or more of the received IP data streams according to a particular policy.

Determining when to initiate or otherwise manage handoff to avoid dropping a call can vary based on a number of factors, including but not limited to network conditions, signal strength, location and the like. As such, described herein are methods, systems, and techniques for managing multiple concurrent IP data streams between a hybrid mobile device and a network based communications server traversing different networks.

BRIEF DESCRIPTION OF THE DRAWINGS

FIG. 1 illustrates an example block diagram for a networked environment.

FIG. 2B illustrates a blended IP stream for a plurality of IP data streams based on packet quality according to an embodiment of the invention.

FIG. 5 illustrates an example timing diagram for a plurality of IP data streams with respect to a user in motion according to an embodiment of the invention.

FIG. 6 illustrates another example timing diagram for a plurality of IP data streams according to an embodiment of the invention.

FIG. 7 illustrates still another example timing diagram for a plurality of IP data streams according to an embodiment of the invention.

FIG. 8 illustrates still another example timing diagram for a plurality of IP data streams according to an embodiment of the invention.

FIG. 9 illustrates still another example timing diagram for a plurality of IP data streams according to an embodiment of the invention.

FIG. 10 illustrates still another example timing diagram for a plurality of IP data streams according to an embodiment of the invention.

DETAILED DESCRIPTION

Figure 2A:
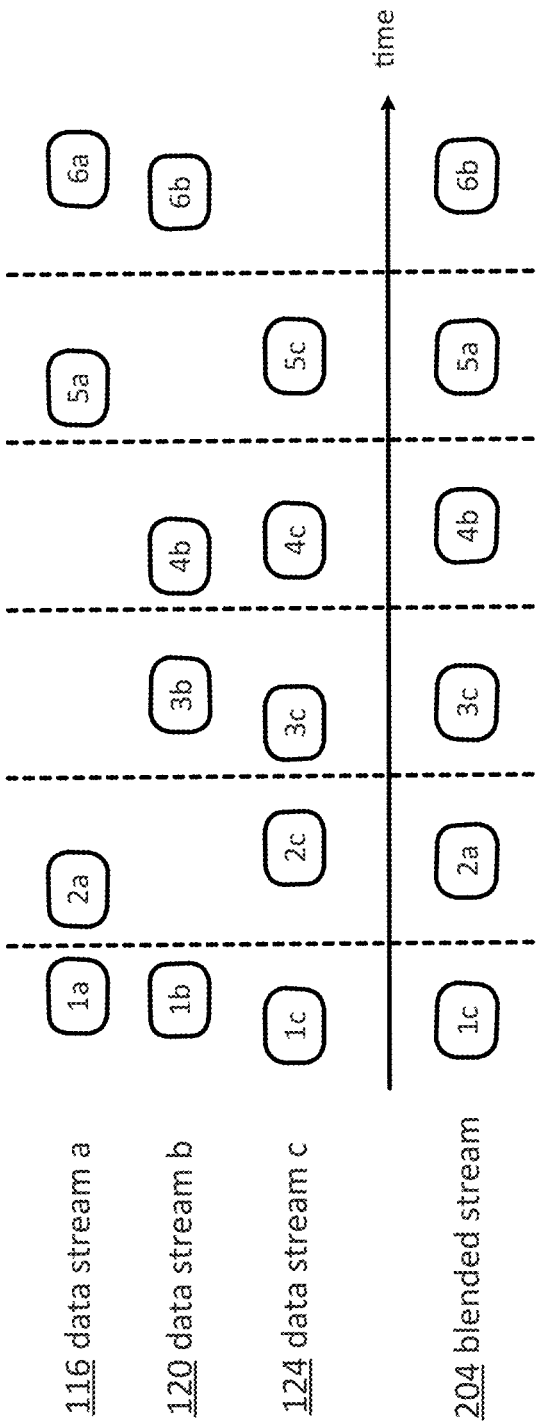
FIG. 2A illustrates a blended IP stream for a plurality of IP data streams based on first packet to arrive according to an embodiment of the invention.

The embodiments described herein disclose systems and methods for intelligently managing multiple concurrent IP data streams between a hybrid mobile device and a network based communications server to enhance communication sessions between or among communication devices. The systems and methods of the invention may be embodied in and performed by communication devices, network based communications server and other devices, and software instructions executed by some or all of such devices, as will be explained in detail below. The different types of networks contemplated herein include, for example, cellular mobile networks both circuit switched and IP based, and data networks, such as the Internet or other IP-based networks, including wide area networks, local area networks, and combinations thereof both wireless (e.g., 802.11) and wireline (e.g., Ethernet).

As used herein the term "communication session" is meant to generally indicate any one-way or two-way exchange of information between two or more communication devices. Communication sessions may include voice, data, video, and multimedia communication sessions, or any other type of data communication sessions or messaging exchanges. As used herein, the term "communication link" is intended to mean a physical and/or logical channel that connects two or more devices with a cloud based communications server. A communication link may be a signaling link or a media link. In this context, a communication session may be established via one or more communication links in which a network based communications server is an endpoint for each of the communication links. The network based communications server may then join one or more communication links together to establish a communication session between or among two or more devices. One or more IP data media streams may be transmitted over one or more communication links. A network based communications server may be situated between communication devices thereby making the network based communications server an endpoint in a communication link. The network based communications server may be hosted within an IP network such as, for instance, the Internet or a LAN/WAN accessible to the Internet.

The convergence of and inter-operation among different types of network technologies (e.g., heterogeneous network inter-operability) blurs the line between various distinct networks. This disclosure discusses access networks that may be characterized as the portion of a communication network that connects subscriber communication devices to a service provider's core network. An access network may also be referred to as the interface between the communication device and the network. Another type of interface may be the interface between networks. That is, the interface necessary to facilitate seamless communication from one network to another.

Therefore, references herein to a communication device, hybrid device, or hybrid mobile device capable of connecting to or communicating via a mobile carrier network refer to a communication device equipped with a cellular transceiver for wireless communication with base stations and other mobile carrier network access points for purposes of accessing circuit switched voice services and/or mobile IP data services. Similarly, references herein to a communication device, hybrid device, or hybrid mobile device capable of connecting to or communicating via a data network refer to a communication device equipped with a transceiver or other network interface for wireless communication (e.g., 802.11) with a router or other data network access point. One particular communication device may be characterized herein as a wireless handset or mobile device. A wireless handset or mobile device may include multiple RF transceivers, one of which may be operable to connect to an access network for a mobile carrier network (e.g., circuit switched or IP data cellular network) and another of which may be operable to connect to an access network for an IP data network (e.g., 802.11) or combinations thereof.

FIG. 1 illustrates an exemplary networked environment 100 for implementing certain exemplary embodiments described herein. The networked environment 100 may include multiple distinct inter-connected networks such as, for instance, a large scale internet protocol (IP) network (e.g., the Internet) 108, one or more IP based local area networks or wide area networks (LAN/WAN) 135 including an 802.11 wireless router 136, a mobile carrier network 127 including a cellular basestation tower 128, and an alternative wireless network 132 including an alternative wireless network access point (not shown).

It should be noted that the alternative wireless network 132 may comprise a second but different mobile carrier (e.g., cellular) network 127 or a wireless network that does not operate over the frequency spectrum typically associated with 802.11 (e.g., WiFi) or cellular. One example of such an alternate wireless network may be WiMAX (e.g., 802.16). Other examples may include, but are not limited to, television whitespace network frequencies and other unlicensed (or yet to be licensed) frequencies. These may include a wireless network operating within a frequency range of 100 MHz and 700 MHz, and a wireless network connection within a frequency range of 3.5 GHz and 3.7 GHz.

While these distinct networks may utilize different protocols and signaling schemes, there are various interfaces that allow for the seamless transition of voice and data (including text, audio, and video) such that various communication endpoints may communicate with one another over one or more of these inter-connected networks.

A mobile carrier network 127 (sometimes referred to as a cellular network) may come in different varieties based on the circuit switched radio transmission scheme between a communication device 140 known as a wireless handset (e.g., mobile, cellular, or hybrid phone) and the mobile carrier network basestation 128 that is in communication with the communication device 140. Two such circuit switched radio transmission schemes are the Global System for Mobile Communication (GSM) and Code Division Multiple Access (CDMA). These circuit switched radio transmission schemes are incompatible with one another necessitating an intervening interface to allow communication between communication devices 140 on either network. In addition, each network may operate over specific frequency ranges. Often, there may even be an intervening network such as the Public Switched Telephone Network (PSTN) (not shown) between two distinct mobile carrier networks. Each mobile carrier network 127 may include an interface to the PSTN (not shown) such that calls crossing that interface can be handled by the receiving network whether it is a mobile carrier network 127 or the PSTN.

Various mobile carrier network operators base their network 127 on one of the circuit switched radio transmission schemes and provide circuit switched service to communication devices 140 using that radio transmission scheme over a defined frequency band. For example, a communication device 140 may wirelessly communicate with a basestation 128 that serves as an access network to the circuit switched portion of the mobile carrier network 127. The basestation 128 authenticates and authorizes the communication device 140 to the mobile carrier network 127 and, in conjunction with other equipment within the mobile carrier network 127, can manage circuit switched calls to and from the communication device 140. The mobile carrier network 127 provides connectivity for any communication device 140 capable of cellular transmission that are physically located within range of the mobile carrier network 127. The range of a mobile carrier network 127 may depend in part on an amplification, power, and/or energy associated with the antennas comprising cellular basestation 128, communication device 140 and the like. As the communication device 140 moves toward the outer range of the mobile carrier network 127, the strength of the cellular signals degrade. The same basic principals apply when accessing the mobile carrier network's 127 cellular IP data services. Once authenticated, the communication device 140 may utilize the IP protocol over the cellular connection to exchange IP data with other devices coupled to the Internet 108 including routers and servers along the path of an IP data packet stream.

Similarly, an IP based data network like the a LAN 135 or Internet 108 may provide wireless connectivity to communication device 140 or other devices within range of an IP access point 136. For instance, an IP access point 136 may provide wireless connectivity to the Internet 108 via a LAN 135 using any of the 802.11 WiFi standards and/or any other type of IP based connectivity standard. As will be appreciated by those of skill in the art, a communication device 140 may experience a stronger connection signal when located closer to an IP access point 136 than when located further away from the IP access point 136. Thus, the strength of the wireless data connection may fade as the communication device 140 moves away from an IP access point 136.

There may also be one or more alternative networks 132 that may provide access to the Internet 108 for a communication device 140. One such alternative network 132 may be characterized as a WiMAX network operable over the 802.16 wireless protocol standard. Another such alternative network 132 may be characterized as a whitespace network. A whitespace network may utilize RF spectrum that is shared with television broadcasters. The television broadcasters do not necessarily utilize all the spectrum allocated to them to broadcast their video signals. The unused spectrum may be tapped into to provide an alternative RF access point to an alternative wireless network 132 that can interface with the Internet 108.

The collection of IP based data networks illustrated in FIG. 1 such as LAN/WANs 135, alternative wireless networks 132, and the Internet 108 may all run on a packet based data transfer protocol (e.g., IP) characterized as packet switching. Packet switching essentially chops up a data stream (e.g., text, voice, data) into segments and transfers them across an IP network to a destination where the packets are re-assembled into the original data stream for output. Voice over IP (VoIP) is a specialized subset of IP packet based communication directed to IP telephony. A communication device 140 may utilize an IP access point 136 to access a local IP network 135 that in turn may access a larger IP network like the Internet 108. The IP access point 136 may be wired, wireless (e.g., WiFi), or a combination wired/wireless access point such as those illustrated in FIG. 1. A VoIP enabled communication device 140 may communicate with an IP access point 136 to gain access to the larger IP network 108 and other communication devices 102.

In certain embodiments, mobile carrier network(s) 127 include cellular networks or portions of cellular networks based on a variety of circuit switched and/or IP data protocols such as, but not limited to, Global System for Mobile Communications (GSM), Code Division Multiple Access (CDMA), General Packet Radio Service (GPRS), Enhanced Data for GSM Evolution (EDGE), Evolution-Data Optimized (EV-DO), High Speed Packet Data (HSPD), High Speed Downlink Packet Access (HSPDA), Long-Term Evolution (LTE), Voice-over Long-Term Evolution (VoLTE), Wideband Code Division Multiple Access (WCDMA), Universal Mobile Telecommunications System (UMTS), or High Rate Packet Data (HRPD) and/or any other cellular network standards.

IP based data networks 108, 132, 135 include, for example, the Internet, one or more intranets, wide area networks (WANs), local area networks (LANs), and the like, portions or all of which may be wireless and/or wired. For instance, an IP based data network 108, 132, 135 may be a wireless network or a portion of a wireless network implemented using an IEEE 802.11 standard such as WiFi, an IEEE 802.16 standard such as WiMAX, and/or any other wireless data communication standard. As is known in the art, communication devices 102, 140 via the various networks 108, 127, 132, 135 may interface with a communications server 112 through gateway devices, routers and/or other appropriate devices (not shown).

A communication device 140 termed herein as a hybrid mobile device includes hardware and software that enable it to communicate over a variety of network interfaces including the one or more of the aforementioned circuit switched cellular, cellular IP data, 802.11 WiFi, and alternative IP networks. One of the, if not the primary, function of the hybrid mobile device 140 is to provide reliable voice communications to other devices in the form of telephone calls. Using the hybrid mobile device's 140 internal radios and connectivity to larger telecommunications networks, the hybrid mobile device may be able to place and receive telephone calls over multiple of the networks. For instance, hybrid mobile devices 140 sold and serviced by Republic Wireless®, Inc. are capable of handling circuit switched cellular calls, VoIP calls over WiFi, and VoIP calls over a cellular IP data connection. Moreover, these particular hybrid mobile devices 140 can seamlessly switch among the various networks during a call such that a call started on one network may be handed-off to another network mid-call if current network connectivity and/or conditions warrant such a handoff.

Performing such a handoff is based on both Quality of Service (QoS) and cost considerations. For instance, calls made over WiFi offer the lowest cost alternative to the service provider while also offering relatively high QoS to the user thereby making "WiFi calling" the preferred alternative for making telephone calls. However, the hybrid mobile device 140 may not always be connected to a WiFi access point 136 or may be initially connected to such an access point 136 but may either roam away from such access point 136 or experience temporary degradation of the connection to that access point 136 during the call. In such scenarios, the hybrid mobile device includes fall back contingencies that enable it to maintain the call and also maintain a minimum level of QoS for the call.

One such contingency may be to handoff the call from the packet based WiFi network to the circuit switched cellular network. This is generally achieved via communication between the hybrid mobile device 140 and the communications server 112 that mediates the call between the hybrid mobile device 140 and an other communication device 102. When one or both of the hybrid mobile device 140 and communications server 112 detect degrading WiFi network conditions (e.g., signal strength, jitter, latency, dropped packets, etc.) to the point where QoS will seemingly fall below an acceptable level, the hybrid mobile device 140 and communications server 112 coordinate to establish a circuit switched cellular connection and once established, the media stream for that leg of the call may be switched from the WiFi network to the circuit switched cellular network. For purposes of the remainder of this disclosure, this may be characterized as the last resort fallback contingency for preserving the communication session (i.e., telephone call).

Other contingencies are based on a multi-streaming approach in which the hybrid mobile device 140 may establish and maintain multiple IP data connections with the communications server 112 simultaneously. These IP connections may include an 802.11 WiFi connection, one or more cellular IP data connections via one or more mobile carrier networks 127, and one or more alternative IP data connections via one or more alternative wireless networks 132. The basic approach is to maintain concurrent IP data streams such that when one experiences connectivity issues that cause QoS to degrade, the affected packets may be replaced from one of the other concurrent IP data streams. This approach may be modified to re-assemble the IP data stream using a first packet to arrive within an allowed time slot or using the highest quality packet to arrive within an allowed time slot.

In an example embodiment, the communications server 112 may be mediating a call between a hybrid mobile device 140 and an other communication device 102. For purposes of this illustration, assume that the call has already been established and is ongoing and that the network interface(s)/data stream between the communications server 112 and the other communication device 102 does not necessarily involve an IP data stream but could. Thus data stream 104 may originally be an analog signal, a digital signal, or an already packetized IP data stream. If not originally a packetized IP data stream, some interface at the IP network edge will convert the data stream 104 to series of discrete IP data packets conforming to the Voice over Internet Protocol (VoIP).

The focus of this example is the link(s) between the hybrid mobile device 140 and the communications server 112. In addition, the communication link between the hybrid mobile device 140 and the communications server 112 may have been originally set up over the 802.11 network access point 136 though this is not necessary. Further, the hybrid mobile device 140 and the communications server 112 may have also established simultaneous concurrent IP data connections over, for example, cellular data network 127 and an alternative wireless network 132. The alternative wireless network 132 may be a second different cellular data network. There are now three distinct IP data streams 124, 116, 120 established between the hybrid mobile device 140 and the communications server 112 over three different networks—WiFi 135, cellular data 127, and alternative 132 respectively. The hybrid mobile device 140 and the communications server 112 may each send out identical IP data streams 124, 116, 120 over these communication links to each other resulting in redundant IP data streams 124, 116, 120. In another embodiment, the hybrid mobile device 140 and the communications server 112 may each send out concurrent but not necessarily identical IP data streams 124, 116, 120 over these communication links to each other resulting in partially redundant IP data streams 124, 116, 120.

As the call progresses, the user of the hybrid mobile device 140 may be on the move. For example, the hybrid mobile device 140 may be moving away from its current WiFi access point 136 resulting in degraded network conditions as determined by latency, jitter, packet loss, etc of data stream 124. The degraded network conditions may affect packet arrival times or even whether a packet arrives at all to its destination. In previous versions of similar systems, this scenario likely prompted a one-time complete handoff from WiFi to circuit switched cellular with no dropping of the call and no loss of QoS. However, the expense to the service provider may be increased since circuit switched cellular is orders of magnitude more expensive on a per minute and/or per MB basis.

Under the techniques described herein, the communications server 112 (or the hybrid mobile device 140 depending on the directionality of the affected communication link) may utilize identical packets from one of the other concurrent IP data streams 116, 120 to maintain an all IP data connection even when the WiFi IP data stream 124 is degraded. There is no need yet to fall back on circuit switched cellular to maintain acceptable QoS. For instance, if the WiFi packets start showing up late but the cellular data packets are on time, the communications server 112 may simply use the cellular data packets to re-assemble a master IP data stream. Even if several WiFi packets are completely dropped, the call quality will not suffer since the other IP data streams 116, 120 can fill the gaps. This also gives the WiFi IP data stream 124 an opportunity to get better which may occur if the user moves closer to the WiFi access point 136. Other embodiments are disclosed and described below.

The hybrid mobile device 140 and the communications server 112 may include IP multi-streaming (IPMS) logic adapted to send/receive multiple IP data streams and assemble them into a single master IP data stream.

FIG. 2A illustrates a blended IP stream 204 for a plurality of IP data streams 116, 120, 124 based on the first packet to arrive within a given time slot according to an embodiment of the invention. In this example, there are three data streams 116, 120, 124 labeled a, b, and c respectively. It is not important which way the data streams are traveling hybrid mobile device 140 to communications server 112 or vice-versa—as each device is configured to handle the multiple IP data streams. Both the hybrid mobile device 140 and the communications server 112 may be equipped to send and receive multiple concurrent IP data streams as well as merge the three IP data streams into a single blended IP data stream. From the perspective of the hybrid mobile device 140, the uplink direction may be characterized as an IP data stream flowing from the hybrid mobile device 140 to the communications server 112 while the downlink direction may be characterized as an IP data stream flowing to the hybrid mobile device 140 from the communications server 112. The techniques described herein may also apply to the uplink only, the downlink only, or both uplink and downlink. For example, the network conditions for uplink may be more problematic than downlink necessitating a multi-stream approach for the uplink but not the downlink. The same logic may be applied when the downlink is more problematic than the uplink.

Each of the IP data streams a, b, and c are traversing different networks between the hybrid mobile device 140 and the communications server 112. The IP data streams have been synchronized to be concurrent with one another. In this example, the IP data streams may be characterized as Real-time Transport Protocol (RTP) audio streams representative of VoIP communications. The data streams may be referred to as RTP-a, RTP-b, and RTP-c. Thus, when the hybrid mobile device 140 or the communications server 112 encodes a packet for each time slice of a packet data stream, instead of sending the packet to a single network interface, it sends the exact same packet to all of the network interfaces simultaneously resulting in multiple concurrent IP data streams between the hybrid mobile device 140 and the communications server 112. In another embodiment, the packets may be intentionally encoded differently for certain streams. For example, a cellular IP data stream may be encoded with less (but still a sufficient amount of) data than a WiFi IP data stream because it may cost less to send less data over cellular than WiFi. Thus, a hypothetical 500 byte data packet sent over WiFi may be the highest quality packet but a corresponding 180 byte packet sent over cellular data may still contain enough information for the application (e.g., VoIP) to function properly. Sending 180 bytes rather than 500 bytes represents a cost savings of 64% on the cellular data charges. It should be noted that the packet with less data still corresponds in time with the packet having more data. That is, they will each fill the same time slot in the corresponding IP data streams.

Further by way of example, RTP-a may be traversing a WiFi network, RTP-b may be traversing a first cellular data network, and RTP-c may be traversing a second cellular data network. Each of the streams is identical in content and synchronized in time but unique in the path taken between the hybrid mobile device 140 and the communications server 112. The timing diagram of FIG. 2 provides the status of the first six packets for each stream on the receiving end. It indicates that packet 1 for each of RTP-a, RTP-b, and RTP-c was received and that packet 1c from the RTP-c stream was received slightly ahead of packets 1a and 1b. Thus, in the resulting blended RTP stream, packet 1c is the first packet. Packets 2a and 2c but not 2b were received next. Packet 2b was dropped for some reason but packets 2a and 2c did arrive with packet 2a slightly ahead of 2c. Thus, packet 2a is the second packet in the blended RTP stream. Similarly, packet 3c is the third packet in the blended RTP stream as it beat out packet 3b while packet 3a never arrived. Packet 4b is the fourth packet of the blended RTP stream. Packet 5a is the fifth packet of the blended RTP stream. Packet 6b is the sixth packet of the blended RTP stream.

The resulting blended RTP stream reads as follows: 1c-2a-3c-4b-5a-6b. In this example, two packets from each of RTP-a, RTP-b, and RTP-c were combined, based on arrival time, to create the blended RTP stream. The example illustrates how multiple RTP streams may be utilized to create the best possible QoS experience for the user. Had there only been one RTP stream, the QoS would have been lower. For instance, both RTP-a and RTP-b dropped two packets from their streams while RTP-c still dropped one packet from its stream. In addition, each of the RTP streams experienced some latency for at least one packet in the RTP streams. However, the blended RTP stream experienced no packet loss and no latency.

Overall QoS (e.g., call quality) may be improved based on known or expected network characteristics. For instance, WiFi networks typically exhibit very low latency and jitter characteristics but may become unreliable (e.g., dropping packets) as the hybrid mobile device moves further away from its WiFi access point. The cellular IP data networks may not be as good as WiFi with respect to jitter and latency but they tend to be more reliable and not drop as many packets. By combining these RTP streams, one can achieve a higher overall QoS than either of the RTP streams separately. Moreover, if the WiFi RTP stream is losing its reliability as a result of moving away from an access point and is finally lost completely, there has been a graceful, non jarring natural handoff from the WiFi network to the cellular data network.

As noted before, each of the hybrid mobile device 140 and the communications server 112 may be capable of sending and receiving multiple concurrent streams and performing the processing to merge the received streams into a single stream based on whatever policies may be in place on the respective receiving device. While the streams are concurrent meaning that corresponding packets for the time slots of each stream contain the exact same content, not all the time slots may be populated for each stream. For example, one IP stream may be designated the primary stream (e.g., WiFi) while any other streams may be designated as secondary. The primary stream may attempt to send packets for each time slot to create an uninterrupted IP stream. The secondary stream(s), however, do not necessarily send a packet for every time slot.

FIG. 2B illustrates a blended IP stream 254 for a plurality of IP data streams 116, 120, 124 based on packet quality according to an embodiment of the invention. In this embodiment, the policy may be more quality oriented as opposed to first to arrive oriented. For instance, the policy may evaluate corresponding packets from each received IP stream that arrive within a given time slot (as denoted by the vertical dashed lines) to determine which packet is the highest quality.

In this example, the blended data stream 254 may be comprised of the following sequence of packets 1b, 2a, 3b, 4b, 5c, and 6a. Each of these packets is slightly shaded in the original streams to indicate that it is the highest quality packet for a given time slot. Moreover, only packets 2a and 4b were the first to arrive within the given time slot indicating that the policy determining the composition of the blended stream 254 places the quality of the arrived packet over the time of arrival of all corresponding packets.

The quality of a packet may be determined by the amount of information it contains. If two corresponding packets are encoded using identical methods (codec, codec settings, input audio data, etc), one can assume that the packet that is larger will contain more information, and therefore provide a higher quality audio for the given time slot.

The WiFi stream can always being sent at "100%" quality. We can then vary the quality of the cellular IP data stream by encoding partial information about the time slot. For example, we can discard high-frequency audio at the transmitter side if we expect that the packet will not be required at the receiver side.

In this scheme, the quality of the cellular IP data stream can scale with the expected utility of that stream. If there is an expected handoff, it will be full quality. But, if it is only used to fix "gaps" in the WiFi stream, it can be of lower quality— and can be considered more of an error-correction scheme than full handoff. This has a different effect than sending only 33% of total packets to save costs because having a packet that has 33% of the audio information may be better than only having 33% of packets.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 3A:
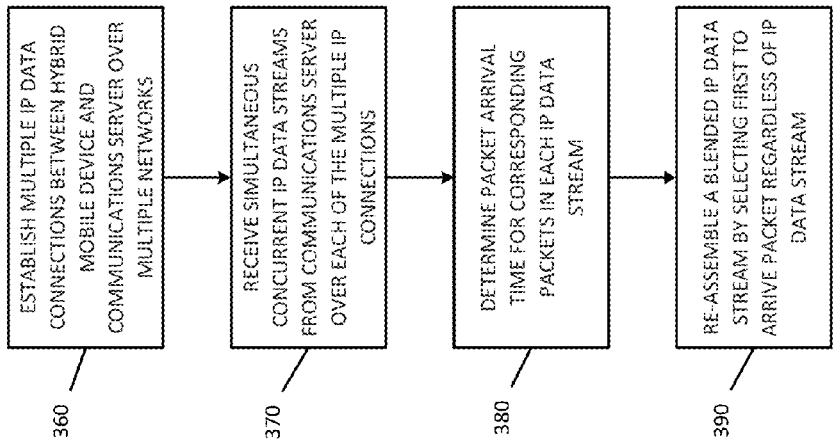
FIG. 3A illustrates an example logic flow diagram according to an embodiment of the invention.

FIG. 3A illustrates an example logic flow diagram 300 according to an embodiment of the invention. In this embodiment, the flow of communication runs from the hybrid mobile device 140 to the communications server 112. In block 310, the hybrid mobile device 140 initiates and establishes multiple IP data connections with the communications server 112. For example, the hybrid mobile device 140 may have a first IP data connection with the communications server 112 via WiFi connectivity to an access point 136 that in turn has connectivity to the communications server 112 via a local area network 135 coupled with the Internet 108. In addition, the hybrid mobile device 140 may have a second IP data connection with the communications server 112 via a cellular IP data connection with a basestation 128 within a cellular network 127 that is connected to the Internet 108. Other IP data connections between the hybrid mobile device 140 and the communications server 112 may exist over other cellular networks or over an alternative wireless network 132 coupled with the Internet 108.

At block 320, the communications server 112 may receive simultaneous concurrent IP data streams 116, 120, 124 from the hybrid mobile device 140 over the IP data connections established in block 310. Each of the IP data streams 116, 120, 124 are identical in content but unique in the path from the hybrid mobile device 140 to the communications server 112. The content of the IP data streams 116, 120, 124 may be, for instance, a VoIP favored Real-time Transport Protocol (RTP) data stream.

At block 330, the communications server 112 may determine a packet arrival time for corresponding packets in each of the IP data streams 116, 120, 124. For example, the first packet from IP data stream 124 (i.e., from the WiFi connection) may arrive ahead of the packets from IP data streams 116, 120 (i.e., from the cellular and alternative network connections). The second packet from IP data stream 116 (i.e., from the cellular connection) may arrive ahead of the packets from IP data streams 124, 120 (i.e., from the WiFi and alternative network connections). The same determination may be made for each subsequent packet that arrives at the communications server 112.

At block 340, the communications server 112 may re-assemble the packet data stream using the first to arrive packet from each of the IP data streams 116, 120, 124. For example, packet 1 in the re-assembled IP data stream may be from the WiFi IP data stream 124 while packet 2 may be from the cellular IP data stream 116. Packet 3 may be from the WiFi IP data stream 124 again while packet 4 may be from the alternative wireless network IP data stream 120. The resulting re-assembled IP data stream may be a combination of the multiple IP data streams 116, 120, 124 using the first to arrive of corresponding packets from the IP data streams 116, 120, 124. The re-assembled IP data stream thus represents a more stable and reliable overall VoIP RTP stream for a telephone call.

Figure 3B:
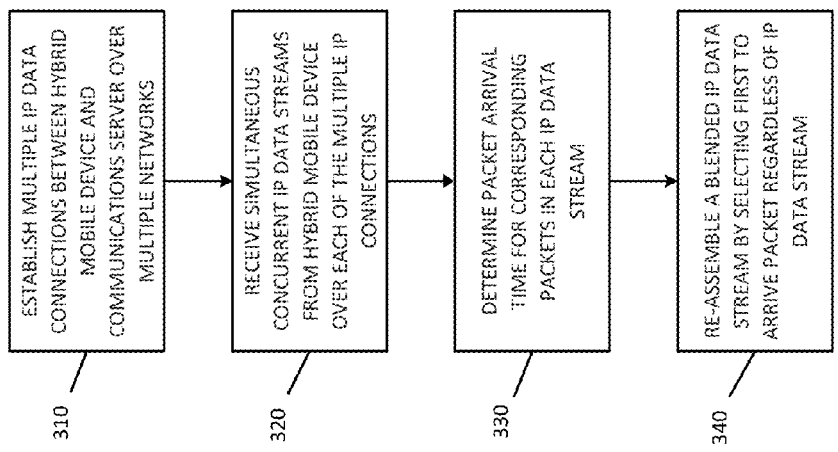
FIG. 3B illustrates another example logic flow diagram according to an embodiment of the invention.

FIG. 3B illustrates another example logic flow diagram 350 according to an embodiment of the invention. In this embodiment, the flow of communication runs from the communications server 112 to the hybrid mobile device 140. In block 360, the communications server 112 initiates and establishes multiple IP data connections with the hybrid mobile device 140. For example, the communications server 112 may have a first IP data connection with the Internet 108 that in turn has connectivity to the hybrid mobile device 140 via a local area network 135 coupled with a WiFi access point 136. In addition, the communications server 112 may have a second IP data connection through the Internet 108 to a cellular IP data connection with a basestation 128 within a cellular network 127 that is communicable with the hybrid mobile device 140. Other IP data connections between the hybrid mobile device 140 and the communications server 112 may exist over other cellular networks or over an alternative wireless network 132 coupled with the Internet 108.

At block 370, the hybrid mobile device 140 may receive simultaneous concurrent IP data streams 116, 120, 124 from the communications server 112 over the IP data connections established in block 310. Each of the IP data streams 116, 120, 124 are identical in content but unique in the path from the communications server 112 to the hybrid mobile device 140. The content of the IP data streams 116, 120, 124 may be, for instance, a VoIP favored Real-time Transport Protocol (RTP) data stream.

At block 380, the hybrid mobile device 140 may determine a packet arrival time for corresponding packets in each of the IP data streams 116, 120, 124. For example, the first packet from IP data stream 124 (i.e., from the WiFi connection) may arrive ahead of the packets from IP data streams 116, 120 (i.e., from the cellular and alternative network connections). The second packet from IP data stream 116 (i.e., from the cellular connection) may arrive ahead of the packets from IP data streams 124, 120 (i.e., from the WiFi and alternative network connections). The same determination may be made for each subsequent packet that arrives at the hybrid mobile device 140.

At block 390, the hybrid mobile device 140 may re-assemble the packet data stream using the first to arrive packet from each of the IP data streams 116, 120, 124. For example, packet 1 in the re-assembled IP data stream may be from the WiFi IP data stream 124 while packet 2 may be from the cellular IP data stream 116. Packet 3 may be from the WiFi IP data stream 124 again while packet 4 may be from the alternative wireless network IP data stream 120. The resulting re-assembled IP data stream may be a combination of the multiple IP data streams 116, 120, 124 using the first to arrive of corresponding packets from the IP data streams 116, 120, 124. The re-assembled IP data stream thus represents a more stable and reliable overall VoIP RTP stream for a telephone call.

Figure 4:
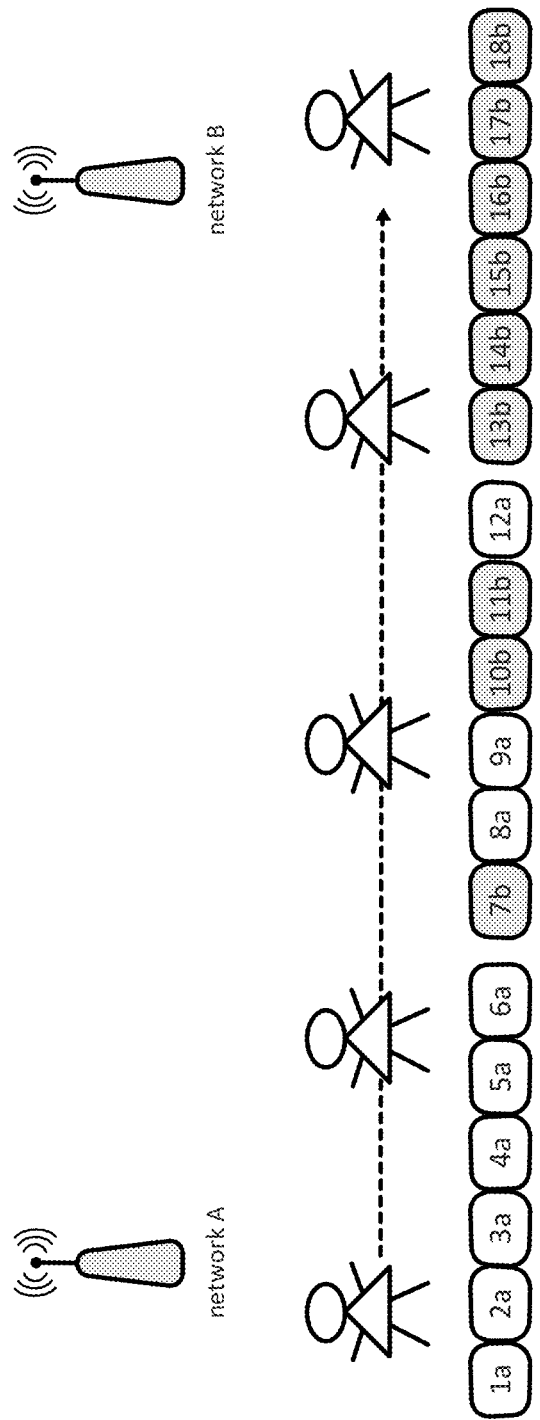
FIG. 4 illustrates an example timing diagram for a pair of IP data streams with respect to a user in motion according to an embodiment of the invention.

FIG. 4 illustrates an example timing diagram 400 for a pair of IP data streams with respect to a user in motion according to an embodiment of the invention. In this embodiment a user possessing a hybrid mobile device 140 is in motion as shown. The user's motion takes them from a location proximate to network A to a location proximate to network B. The hybrid mobile device 140 is equipped and configured to establish simultaneous concurrent IP data streams to a communications server 112 (not shown in FIG. 4) via access points to networks A and B. In this example, the IP data streams may represent a VoIP telephony call comprised of RTP packets. A sequence of eighteen (18) RTP packets is also illustrated in which each numbered packet also includes a network identifier—a or b. While in actuality, many more packets than eighteen (18) may be exchanged between the hybrid mobile device 140 and the communications server 112 during the user's illustrated path, the illustration conveys the principles of the embodiment.

As the user begins, she is much closer to network A than to network B. Thus, the first six (6) RTP packets are exchanged using the IP data stream associated with network A. The seventh RTP packet, however, was exchanged using the IP data stream associated with network B. This may have occurred for a variety of reasons even though the distance to network A is still closer than the distance to network B. For example, network A may have experienced a temporary service degradation causing a delay in packet transmission or even a dropped packet among other potential service disruptions. The delay may have allowed RTP packet 7 from network B to arrive slightly ahead of RTP packet 7 from network A. If RTP packet 7 from network A were dropped then the hybrid mobile device 140 and/or the communications server 112 may have used RTP packet 7 from network B instead.

RTP packets 8 and 9 are exchanged using network A maybe because network A resolved its service disruption and its packets arrived ahead of network B's packets. RTP packets 10 and 11 are indicated as being exchanged with network B. This makes sense as the user may now be located closer to network B than network A. This transition may be termed natural handover since the hybrid mobile device 140 and the communications server 112 are left to decide which IP data stream to utilize. This decision may be policy based considering factors such as first packet to arrive within that packet's allocated time slot or the highest quality packet to arrive within the allocated time slot. RTP packet 12 is indicated from network A potentially for the same reason that RTP packet 7 was exchanged with network B. There could be a temporary service disruption with network B. RTP packets 13-18 are all indicated as exchanged with network B as one might expect based on the user's motion and location.

Viewing the RTP packet data stream as a whole indicates a natural handover from network A to network B with a couple RTP packets (e.g., 7 and 12) from the further network potentially due to a temporary disruption of the closer network.

FIG. 5 illustrates an example timing diagram 500 for a plurality of IP data streams with respect to a user in motion according to an embodiment of the invention. In this embodiment a user possessing a hybrid mobile device 140 is in motion as shown. The user's motion takes them from a location proximate to network A to a location proximate to network B and then to a location proximate to network C. The hybrid mobile device 140 is equipped and configured to establish simultaneous concurrent IP data streams to a communications server 112 (not shown in FIG. 4) via access points to networks A, B and C. In this example, the IP data streams may represent a VoIP telephony call comprised of RTP packets. A sequence of eighteen (18) RTP packets is also illustrated in which each numbered packet also includes a network identifier—a, b or c. While in actuality, many more packets than eighteen (18) may be exchanged between the hybrid mobile device 140 and the communications server 112 during the user's illustrated path, the illustration conveys the principles of the embodiment.

As the user begins, she is much closer to network A than to networks B or C. Similar to FIG. 5, the network exchanging RTP packets with the hybrid mobile device 140 is typically the one that the user is closest to. There may be anomalies to the pattern (e.g., RTP packets 3, 5, 7, 12, and 18) due to minor network service disruptions that may cause delay, latency, jitter, or even a dropped packet. In general, however, a natural handover from network A to network B to network C may occur based on the path traveled by the user holding the hybrid mobile device 140. A side benefit to multiple concurrent IP data streams from different networks is the ability to substitute a packet from another network when the expected network experiences delay, jitter, latency, or a dropped packet. This substitution helps maintain a QoS standard that would not be possible if the hybrid mobile device were limited to a single IP data stream over a single IP data network.

The ability to use multiple concurrent IP data streams also allows for overall network optimization in that each of the networks capable of carrying an IP packet may be analyzed for quality each time a packet is received. In some embodiments, WiFi will always be the preferred network since it is the lowest cost alternative. In most instances, there is no data fee associated with using a WiFi 802.11 network to exchange IP packet data. In contrast, cellular IP data networks typically charge fees for carrying IP packet data on their network. In fact, these cellular data fees can be quite expensive. Thus, a technique that prefers WiFi over cellular data when possible is preferred. In the realm of voice calls, there are three (3) distinct network types: VoIP over WiFi, VoIP over cellular data, and circuit switched cellular. From a cost perspective, VoIP over WiFi is the least expensive followed by VoIP over cellular data and finally circuit switched cellular.

Telephony is an extremely user sensitive application as it pertains to a user's ability to discern good call quality from bad call quality. For instance, dropped packets that cause gaps in a conversation, or significant packet delay is extremely noticeable and annoying to users on a telephone call since a telephone call is an expected real-time exchange of audio data between the users. The goal is to maintain a sufficient audio experience while using the least expensive network(s) to deliver the audio data. WiFi is very high quality when the hybrid mobile device 140 maintains a strong signal and no other factors impair the WiFi network. Similarly cellular data is reliable when its signal strength is maintained. Circuit switched cellular is not an IP packet based audio protocol but is very reliable in most instances. For a given telephone call, the cost of circuit switched voice, however, can be significantly more expensive than cellular IP data. Thus, the preferred order of network usage for executing a telephone call from a cost perspective is WiFi then cellular IP data then circuit switched cellular. However, a minimum quality standard must be maintained at all times during the call that may necessitate usage of a more expensive network at times. Regardless of the network(s) being used at any given moment, a transition from one to another should be seamless so as not to let the user know any change has occurred.

The hybrid mobile device 140 and/or the communications server 112 may enact policies for testing networks and switching among networks to maximize quality (or at least maintain a minimum quality level) while minimizing cost. For example, a call may be on the preferred WiFi network. While conditions are fine at the moment for maintaining the call on WiFi, such conditions could change quickly necessitating a handoff to a different network. In advance of such a handoff, it behooves the hybrid mobile device 140 of knowing whether the network considered for the handoff can maintain a sufficient IP data connection. If it cannot, the hybrid mobile device may fall back onto the most expensive alternative—circuit switched cellular. So long as the WiFi connection is good, the hybrid mobile device may turn off the cellular IP data connection to save on data costs. When the WiFi connection starts to exhibit lower performance, the cellular IP data connection may be re-established as a fall back.

FIG. 6 illustrates another example timing diagram 600 for a plurality of IP data streams according to an embodiment of the invention. In this example, IP data stream-a 116 may be a WiFi connection transporting RTP packets while IP data stream-b 120 may be a cellular data connection transporting RTP packets. There is a blended stream 204 indicative of the corresponding packet from one of the IP data streams 116, 120 that arrived first. FIG. 6 illustrates that IP data stream-b 120 is experiencing a large percentage of dropped packets making it currently unreliable as a fall back network. Specifically RTP packets 2, 4, and 5 have been dropped from the stream. The resulting blended IP data stream 204 is identical to the WiFi IP data stream 116. In such a case, the hybrid mobile phone may turn off the cell data connection and resort to the circuit switched cellular network as a fall back should the WiFi network connection become insufficient.

FIG. 7 illustrates still another example timing diagram 700 for a plurality of IP data streams according to an embodiment of the invention. In this example, IP data stream-a 116 may be a WiFi connection transporting RTP packets while IP data stream-b 120 may be a cellular data connection transporting RTP packets. There is a blended stream 204 indicative of the corresponding packet from one of the IP data streams 116, 120 that arrived first. FIG. 7 illustrates that IP data stream-b 120 is sufficient but the resulting blended IP data stream 204 is identical to the WiFi IP data stream 116 indicating a strong WiFi connection. In such a case, the hybrid mobile phone may turn off the cell data connection as it is currently unnecessary due to the quality of the WiFi connection. Should the WiFi connection degrade, the hybrid mobile device 140 may be re-established and used as a fall back to maintain call continuity and quality.

As indicated above, running multiple IP data streams over multiple networks for a VoIP telephone call between a hybrid mobile device 140 and a communications server 112 is not without cost. There are certainly QoS (quality of service)

reasons for running multiple concurrent IP data streams and in many cases involving handoff, there can be cost savings to maintaining multiple concurrent IP data streams. The cost savings may be balanced against the instantaneous need for multiple concurrent IP data streams. For example, multiple concurrent IP data streams may be desired but it may not necessarily be necessary to send a full IP data stream over all of the network connections. Since a WiFi connection costs the least (free in many cases), it is the preferred IP data stream. Cellular IP data streams may serve as fall backs when WiFi service degrades. The extent of data packets sent over the cellular IP data connection may be intentionally varied based on the current WiFi network conditions. For example, an excellent WiFi network connection may require no cellular fall back and therefore the cellular IP data connection does not stream any packets concurrent with the WiFi packet stream. Should the hybrid mobile device 140 or the communications server 112 detect deteriorating WiFi network conditions (e.g., jitter, latency, delay, dropped packets), a concurrent packet data stream may be initiated over the cellular IP data connection. The extent to which the cellular IP data connection is utilized may vary based on the current quality of the WiFi connection. For instance, the WiFi connection may be experiencing slight degradation such that a 25% supplemental cellular IP data packet stream would maintain overall QoS for the telephone call. A 25% cellular IP data packet stream corresponds to sending every fourth packet.

FIG. 8 illustrates still another example timing diagram 800 for a plurality of IP data streams according to an embodiment of the invention. In this example, the WiFi packet stream 116 is currently high quality eliminating the need for a cellular IP data packet stream 120 fall back. This is illustrated by a blended packet data stream 204 comprised solely of the WiFi packet data stream 116. There are no packets associated with the cellular IP data packet stream 120 (i.e., 0% utilization) since this connection is currently not in use due to the strength and quality of the WiFi connection.

FIG. 9 illustrates still another example timing diagram 900 for a plurality of IP data streams according to an embodiment of the invention. In this example, the WiFi packet stream 116 is experiencing slightly lower quality (e.g., packet 3) than the WiFi packet stream 116 shown in FIG. 8. In this scenario, an algorithm applied to the WiFi network characteristics may have determined that a 50% cellular IP data packet stream 120 utilization makes sense. This is illustrated by a blended packet data stream 204 comprised mainly of the WiFi packet data stream 116 but for packet 3 that came from the cellular IP data packet stream 120. If WiFi network conditions improve, then cellular IP data packet stream 120 utilization may decrease. Similarly, if WiFi network conditions continue to degrade, then cellular IP data packet stream 120 utilization may increase.

FIG. 10 illustrates still another example timing diagram 1000 for a plurality of IP data streams according to an embodiment of the invention. In this example, the WiFi packet stream 116 is experiencing slightly lower quality still (e.g., packets 2, 4, and 5 experiencing slight delays) than the WiFi packet stream 116 shown in FIGS. 8 and 9. In this scenario, an algorithm applied to the WiFi network characteristics may have determined that a 100% cellular IP data packet stream 120 utilization makes sense. This is illustrated by a blended packet data stream 204 comprised of a blend of the WiFi packet data stream 116 (packets 1, 3, and 6) and the cellular IP data packet stream 120 (packets 2, 4, and 5).

Algorithms that monitor and evaluate IP packet data traffic over the WiFi and/or cellular IP data connections may consider one or more of multiple network parameters either alone or in combination to come up with a triggering mechanism that determines how much to utilize a secondary IP network connection. Some of the network parameters include jitter, latency, delay, and dropped packets. Certain threshold levels of these parameters may indicate when and how much to utilize a secondary IP network connection.

Figure 11:
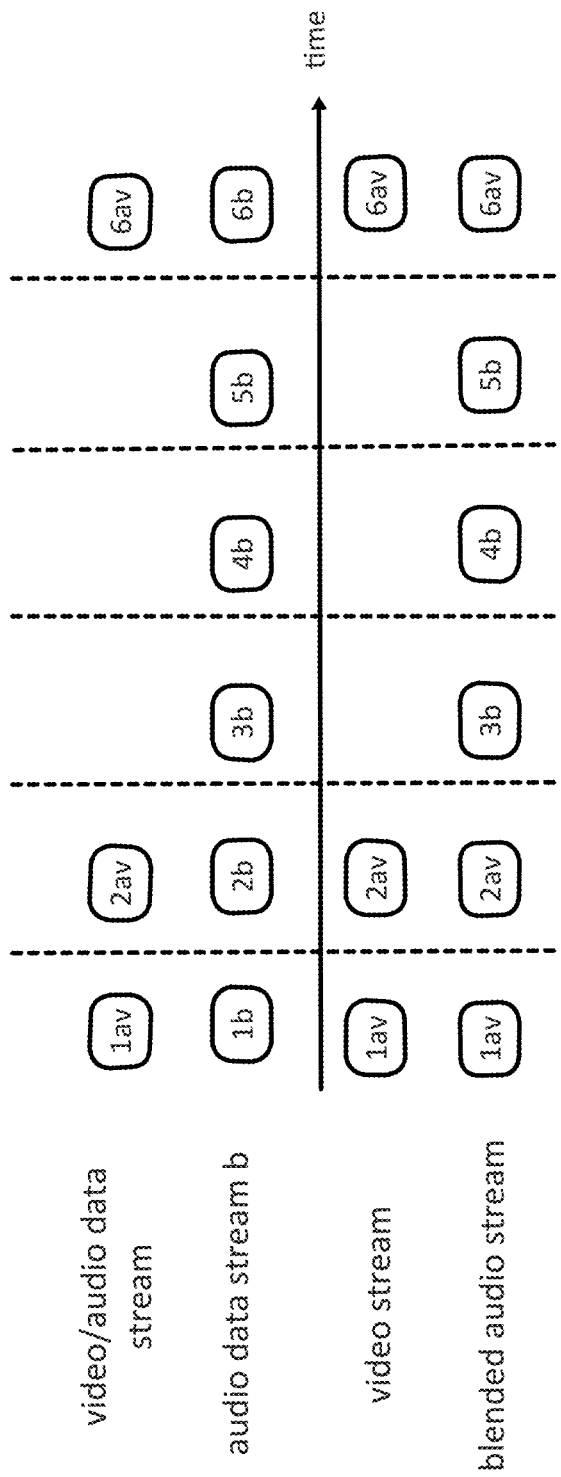
FIG. 11 illustrates still another example timing diagram for a plurality of IP data streams including video and audio according to an embodiment of the invention.

FIG. 11 illustrates still another example timing diagram 1100 for a plurality of IP data streams including video and audio according to an embodiment of the invention. In this example a video packet data stream comprised of audio and video RTP packets is being exchanged between a hybrid mobile device 140 and a communications server 112. A secondary IP data stream comprised just of the audio RTP packets is being exchanged between the hybrid mobile device 140 and the communications server 112 over a different IP network connection. Should the audio and video RTP packet stream be interrupted or experience less than ideal network conditions causing an interruption of the audio and video RTP packet stream, the audio RTP packet stream from the secondary IP network may be used to keep the audio portion of the stream ongoing. This may be useful for video-conferencing applications in which the audio portion may be maintained when the main audio/video RTP packet stream is compromised. This is illustrated in FIG. 11 where the video stream has dropped packets 3-5 but the audio from the secondary IP data stream fills in the missing packets in the blended audio stream. Thus, the audio portion maintains continuity until the video comes back on-line.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled", "connected", or "capable of being coupled" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What is claimed is:

1. A method comprising:
   in a communications server situated in an Internet Protocol (IP) based packet data network:
      hosting a communication session between a hybrid mobile device and a second communication device in which the communications server functions as a bridge service between the hybrid mobile device and the second communication device, wherein the communications server has established separate communication links with the hybrid mobile device and the second communication device, and wherein the hybrid mobile device and the communications server are capable of exchanging multiple concurrent IP packet data media streams over corresponding multiple different communication links;
      receiving multiple concurrent IP packet data media streams over corresponding multiple different communication links and network connections;
      determining a packet arrival time for each corresponding packet in the multiple concurrent IP packet data media streams; and
      creating a blended IP packet data media stream by selecting the first to arrive packet from among the multiple concurrent IP packet data media streams; and
      sending the blended IP packet data media stream to the second communication device.

2. The method of claim 1, the different communication link and IP based packet data network comprising one of an 802.11 WiFi network connection, a cellular network connection, an 802.16 WiMax network connection, a wireless network connection operating within a frequency range of 100 MHz and 700 MHz, and a wireless network connection operating within a frequency range of 3.5 GHz and 3.7 GHz.

3. The method of claim 2, the cellular network connection utilizing an IP protocol based on one of a General Packet Radio Service (GPRS), Enhanced Data for GSM Evolution (EDGE), Evolution-Data Optimized (EV-DO), High Speed Packet Data (HSPD), High Speed Downlink Packet Access (HSPDA), Long-Term Evolution (LTE), Voice-over Long-Term Evolution (VoLTE), Wideband Code Division Multiple Access (WCDMA), Universal Mobile Telecommunications System (UMTS), or High Rate Packet Data (HRPD).

4. The method of claim 1, the IP packet data media streams comprising a Voice-over Internet Protocol (VoIP) media stream.

5. The method of claim 4, the VoIP media stream comprised of Real-time Transport Protocol (RTP) packets.

6. A method comprising:
   in a communications server situated in an Internet Protocol (IP) based packet data network:
      hosting a communication session between a hybrid mobile device and a second communication device in which the communications server functions as a bridge service between the hybrid mobile device and the second communication device, wherein the communications server has established separate communication links with the hybrid mobile device and the second communication device, and wherein the hybrid mobile device and the communications server are capable of exchanging multiple concurrent IP packet data media streams over corresponding multiple different communication links;
      receiving an IP packet data media stream from the second communication device;
      encoding each received packet into multiple concurrent IP packet data media streams; and
      sending each concurrent IP packet data media stream to the hybrid mobile device over a different communication link and IP based network.

7. The method of claim 6, the different communication link and IP based packet data network comprising one of an 802.11 WiFi network connection, a cellular network connection, an 802.16 WiMax network connection, a wireless network connection operating within a frequency range of 100 MHz and 700 MHz, and a wireless network connection operating within a frequency range of 3.5 GHz and 3.7 GHz.

8. The method of claim 7, the cellular network connection utilizing an IP protocol based on one of a General Packet Radio Service (GPRS), Enhanced Data for GSM Evolution (EDGE), Evolution-Data Optimized (EV-DO), High Speed Packet Data (HSPD), High Speed Downlink Packet Access (HSPDA), Long-Term Evolution (LTE), Voice-over Long-Term Evolution (VoLTE), Wideband Code Division Multiple Access (WCDMA), Universal Mobile Telecommunications System (UMTS), or High Rate Packet Data (HRPD).

9. The method of claim 6, the IP packet data media streams comprising a Voice-over Internet Protocol (VoIP) media stream.

10. The method of claim 9, the VoIP media stream comprised of Real-time Transport Protocol (RTP) packets.

11. A communications server situated in an Internet Protocol (IP) based packet data network comprising:
    a memory unit for storing code;
    at least one processor for executing the stored code to:
       host a communication session between a hybrid mobile device and a second communication device in which the communications server functions as a bridge service between the hybrid mobile device and the second communication device, wherein the communications server has established separate communication links with the hybrid mobile device and the second communication device, and wherein the hybrid mobile device and the communications server are capable of exchanging multiple concurrent IP packet data media streams over corresponding multiple different communication links;
       receive multiple concurrent IP packet data media streams over corresponding multiple different communication links and network connections;
       determine a packet arrival time for each corresponding packet in the multiple concurrent IP packet data media streams; and
       create a blended IP packet data media stream by selecting the first to arrive packet from among the multiple concurrent IP packet data media streams; and
       send the blended IP packet data media stream to the second communication device.

12. The communications server of claim 11, the different communication link and IP based packet data network comprising one of an 802.11 WiFi network connection, a cellular network connection, an 802.16 WiMax network connection, a wireless network connection operating within a frequency range of 100 MHz and 700 MHz, and a wireless network connection operating within a frequency range of 3.5 GHz and 3.7 GHz.

13. The communications server of claim 12, the cellular network connection utilizing an IP protocol based on one of a General Packet Radio Service (GPRS), Enhanced Data for GSM Evolution (EDGE), Evolution-Data Optimized (EV-DO), High Speed Packet Data (HSPD), High Speed Downlink Packet Access (HSPDA), Long-Term Evolution (LTE), Voice-over Long-Term Evolution (VoLTE), Wideband Code Division Multiple Access (WCDMA), Universal Mobile Telecommunications System (UMTS), or High Rate Packet Data (HRPD).

14. The communications server of claim 11, the IP packet data media streams comprising a Voice-over Internet Protocol (VoIP) media stream.

15. The communications server of claim 14, the VoIP media stream comprised of Real-time Transport Protocol (RTP) packets.

16. A communications server situated in an Internet Protocol (IP) based packet data network comprising:
   a memory unit for storing code;
   at least one processor for executing the stored code to:
      host a communication session between a hybrid mobile device and a second communication device in an Internet Protocol (IP) based packet data network in which the communications server functions as a bridge service between the hybrid mobile device and the second communication device, wherein the communications server has established separate communication links with the hybrid mobile device and the second communication device, and wherein the hybrid mobile device and the communications server are capable of exchanging multiple concurrent IP packet data media streams over corresponding multiple different communication links;
      receive an IP packet data media stream from the second communication device;
      encode each received packet into multiple concurrent IP packet data media streams; and
      send each concurrent IP packet data media stream to the hybrid mobile device over a different communication link and IP based network.

17. The communications server of claim 16, the different communication link and IP based packet data network comprising one of an 802.11 WiFi network connection, a cellular network connection, an 802.16 WiMax network connection, a wireless network connection operating within a frequency range of 100 MHz and 700 MHz, and a wireless network connection operating within a frequency range of 3.5 GHz and 3.7 GHz.

18. The communications server of claim 17, the cellular network connection utilizing an IP protocol based on one of a General Packet Radio Service (GPRS), Enhanced Data for GSM Evolution (EDGE), Evolution-Data Optimized (EV-DO), High Speed Packet Data (HSPD), High Speed Downlink Packet Access (HSPDA), Long-Term Evolution (LTE), Voice-over Long-Term Evolution (VoLTE), Wideband Code Division Multiple Access (WCDMA), Universal Mobile Telecommunications System (UMTS), or High Rate Packet Data (HRPD).

19. The communications server of claim 16, the IP packet data media streams comprising a Voice-over Internet Protocol (VoIP) media stream.

20. The communications server of claim 19, the VoIP media stream comprised of Real-time Transport Protocol (RTP) packets.

* * * * *